United States Patent
Lee et al.

(10) Patent No.: US 7,490,078 B2
(45) Date of Patent: Feb. 10, 2009

(54) STREAM DATA PROCESSING SYSTEM AND METHOD FOR AVOIDING DUPLICATION OF DATA PROCESS

(75) Inventors: Hun-Soon Lee, Daejon (KR); Mi-Young Lee, Daejon (KR); Myung-Joon Kim, Daejon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 253 days.

(21) Appl. No.: 11/607,279

(22) Filed: Nov. 29, 2006

(65) Prior Publication Data

US 2007/0136239 A1    Jun. 14, 2007

(30) Foreign Application Priority Data

Dec. 1, 2005  (KR) ............... 10-2005-0116098
Feb. 20, 2006  (KR) ............... 10-2006-0016335

(51) Int. Cl.
    *G06F 7/00* (2006.01)
(52) U.S. Cl. .......................................... 707/1; 707/4
(58) Field of Classification Search .......... 707/1–10
    See application file for complete search history.

(56) References Cited

U.S. PATENT DOCUMENTS

| | | | |
|---|---|---|---|
| 6,553,394 B1 | 4/2003 | Perry et al. | 708/200 |
| 7,113,979 B1* | 9/2006 | Smith et al. | 709/217 |
| 7,181,438 B1* | 2/2007 | Szabo | 707/2 |
| 7,293,024 B2* | 11/2007 | Bayliss et al. | 707/10 |
| 2004/0034616 A1* | 2/2004 | Witkowski et al. | 707/1 |

FOREIGN PATENT DOCUMENTS

KR    1020060067126    6/2006

OTHER PUBLICATIONS

Arasu, A., et al., "The CQL continuous Query Language: Semantic Foundations and Query Execution." 2003. *Stanford University Technical Report.*
Li, J., et al., "Semantics and Evaluation Techniques for Window Aggregates in Data streams." 2005. *SIGMOD 2005*, pp. 311-322.
KIPO Notice of Patent Grant dated Feb. 26, 2008 for the corresponding application KR 10-2006-0016335.

* cited by examiner

*Primary Examiner*—Wilson Lee
(74) *Attorney, Agent, or Firm*—Ladas & Parry LLP (57) ABSTRACT

Provided is a stream data processing system and method for avoiding duplication of data process. The system including: an evaluation result storing unit for updating and storing a query condition evaluation result; a window evaluating unit for performing window evaluation; a data separating unit for separating data into new data and duplication input data; a reuse result extracting unit for receiving duplication input data from the data separating unit and extracting a query condition evaluation result; a query condition evaluating unit for receiving new data from the data separating unit, performing query condition evaluation and creating a query condition evaluation result; and a result organizing unit for receiving the query condition evaluation result, merging, outputting and transmitting the query condition evaluation result to the evaluation result storing unit.

20 Claims, 11 Drawing Sheets

FIG. 1A

LANDMARK WINDOW

FIG. 1B

SLIDING WINDOW

```
<observetion>
  <book>
    <title> Data base </title>
    <price> 20000 </price>
  <book>
</observation>
```
310

```
<observetion>
  <book>
    <title> Data Structure </title>
    <price> 18000 </price>
  </book>
  <book>
    <title> JAVA </title>
    <price> 11000 </price>
  </book>
</observation>
```
311

```
<observetion>
  <book>
    <title> TOFLE </title>
    <price> 15000 </price>
  </book>
  <book>
    <title> Longman Dictionary </title>
    <price> 21000 </price>
  </book>
</observation>
```
312

```
<observetion>
  <book>
    <title> Algorithm </title>
    <price> 17000 </price>
  </book>
  <book>
    <title> Data Structure </title>
    <price> 18000 </price>
  </book>
  <book>
    <title> GOOD NEWS </title>
    <price> 7000 </price>
  </book>
</observation>
```
313

```
<observetion>
  <book>
    <title> The Old Man and The Sea </title>
    <price> 8000 </price>
  <book>
</observation>
```
314

```
<observetion>
  <book>
    <title> C </title>
    <price> 18000 </price>
  <book>
</observation>
```
315

```
<observetion>
  <book>
    <title> King Arthur </title>
    <price> 13000 </price>
  <book>
</observation>
```
316

```
<observetion>
  <book>
    <title> Bible </title>
    <price> 23000 </price>
  <book>
</observation>
```
317

```
<observetion>
  <book>
    <title> Harry Potter </title>
    <price> 12000 </price>
  <book>
</observation>
```
318

```
<observetion>
  <book>
    <title> TOEIC </title>
    <price> 14000 </price>
  <book>
  <book>
    <title> POP's English </title>
    <price> 5000 </price>
  <book>
</observation>
```
319

```
<observetion>
  <book>
    <title> Englisg Cafe </title>
    <price> 5000 </price>
  <book>
</observation>
```
320

STREAM DATA PROCESSING SYSTEM AND METHOD FOR AVOIDING DUPLICATION OF DATA PROCESS

FIELD OF THE INVENTION

The present invention relates to a stream data processing system and method for avoiding duplication of data process; and, more particularly, to a stream data processing system and method which can improve performance of an entire system and reduce resources loss by avoiding duplication of data process, i.e., duplication query evaluation based on a previous query condition evaluation result in a continuous query process including a window operation.

DESCRIPTION OF RELATED ART

Extensible Markup Language (XML) is a next generation Internet electronic document standard made by improving shortcomings of Hyper Text Markup Language (HTML) and Standard Generalized Markup Language (SGML). The XML is independent from a platform and can easily transmit and exchange document information. Also, the XML can show the exact meaning of the document. The XML was selected as recommendations in W3C on February, 1998 and is getting more actively applied.

Diverse data such as product information, temperature and humidity are gathered from diverse sensors in real-time in a ubiquitous environment. The collected data shows a form of stream data continuously created and transmitted through a network. Interests on development of a stream data processing system for efficiently processing the stream data are increasing.

A query for the stream data in the stream data processing system is called a continuous query to distinguish from one time query that a data set, i.e., an object of the query, queries in a predetermined environment and acquires the result, just as in a conventional database managing system. The query searches the stream data by continuously applying the query to the stream data continuously created and inputted after registration of the query and searches.

Since the continuous query performs more than one continuous query procedure on each of the stream data collected by more than one sensor, data quantity for process is massive.

A concept of a window is used to limit a query object in the continuous query. Since it is not possible to simultaneously query all stream data which are continuously created and inputted, the stream data as the query object is logically limited. Methods for limiting general input data include a method for using each of time and event number, i.e., a tuple number.

Figure 1A:
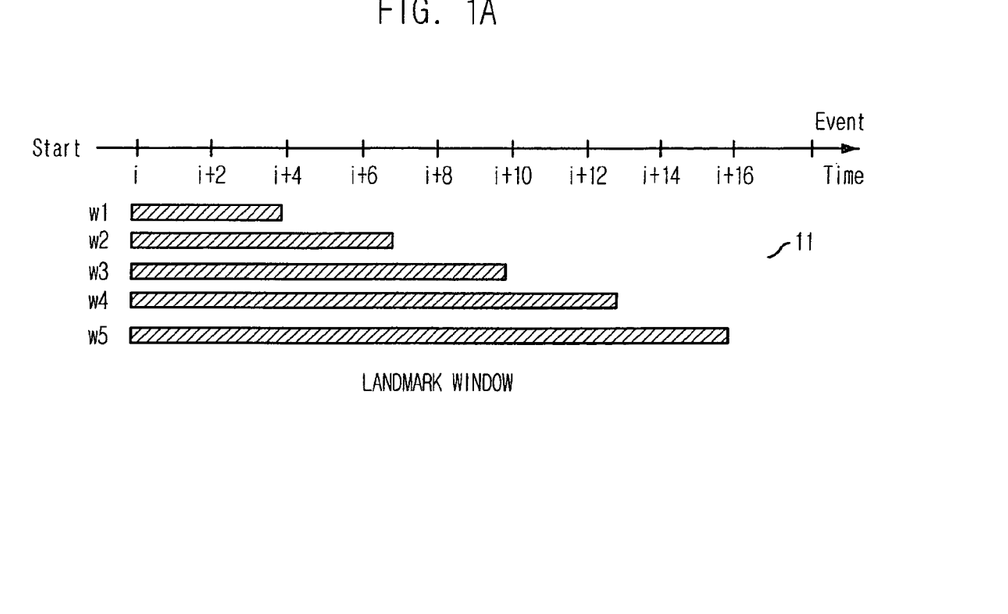
FIGS. 1A and 1B show a window concept used in a continuous query process of stream data.
Figure 1B:
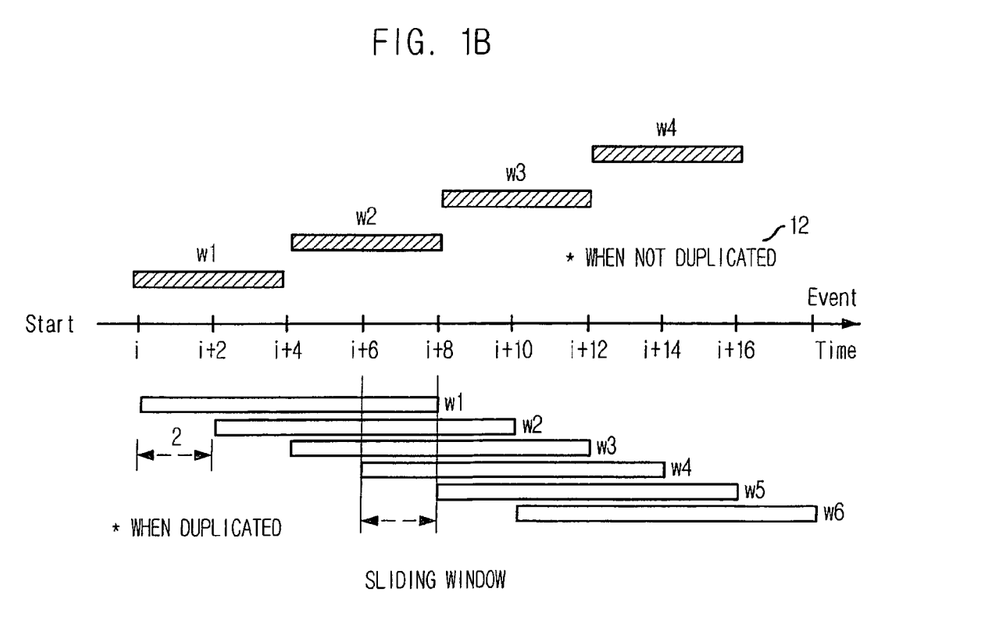

FIGS. 1A and 1B show a window concept used in a continuous query process of the stream data.

A representative window used in the continuous query process includes a landmark window and a sliding window.

Referring to reference number 11, in the landmark window whose start is fixed and end moves, all data used in previous query evaluation are used in next query evaluation.

Referring to reference number 12, in the sliding window whose start and end move, data of a duplicated part are used as input data in next query evaluation. For example, since the data inputted in "i+6" to "i+8" section are included in windows w1, w2, w3 and w4, the data are used as the input data in query evaluation of 4 times.

Figure 2:
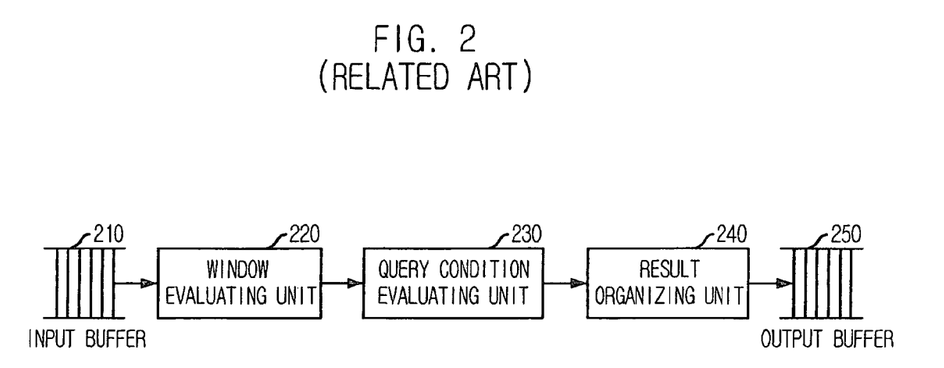
FIG. 2 shows a conventional stream data processing system logy.

FIG. 2 shows a stream data processing system based on a conventional technology.

The conventional stream data processing system includes an input buffer 210, a window evaluating unit 220, a query condition evaluating unit 230, a result organizing unit 240, and output buffer 250. The window evaluating unit 220 reads the stream data from the input buffer 210 and evaluates window. The query condition evaluating unit 230 evaluates query condition for the stream data. The result organizing unit 240 creates a query evaluation result.

When the continuous query is processed, procedures including window evaluation, query condition evaluation, and creation of query evaluation result are repeatedly performed. Since the data inputted in "i+6" to "i+8" section are included and evaluated in each window of w1, w2, w3 and w4 4 times in the window evaluation procedure, the query is evaluated 4 times.

U.S. Pat. No. 6,553,394 (reference 1), registered on Apr. 22, 2003, discloses continuous memorization. The reference 1 relates to a technology for creating a future result based on previous input/output data by a method for continuously accumulating input parameters and process results. The reference 1 is applied to calculation for a mathematical function including an exponential function, an algebraic function and a gauss function. That is, since the calculated result is used again in next calculation, input/output data are continuously accumulated.

However, there is a limitation when the reference 1 is applied to the stream data processing system for receiving and processing the stream data from diverse sensors of the ubiquitous environment. That is, since the data sensed by each sensor of the ubiquitous environment are generally different from each other, a reuse rate of data is low and the quantity of the data to be processed is massive. Accordingly, the reference 1 operated by a method for accumulating data has a limitation to be applied to the stream data processing system in which memory resources easily lack.

A general-purpose stream processing system is proposed in an article by A. Arasu, S. Babu, J. Widom, entitled "STREAM", The CQL continuous Query Language: Semantic Foundation and Query Execution, *Stanford Univ. Technical Report,* 2003.10. The general-purpose stream processing system processes a continuous query on a plurality of continuous data streams and relations stored in the storage. The system buffers each of input data to evaluate windows including the sliding window and maintains the input data until unnecessary. That is, each input tuple is included in a plurality of windows and stored until the last window including the tuple is evaluated. It means that the data should be accessed and processed many times. Accordingly, there is a problem that unnecessary resources are wasted in application to the stream data processing system.

A method of "Jin Li" is proposed in an article by Jin Li, David Maier et al., Semantics and Evaluation Techniques for Window Aggregates in Data Streams, *SIGMOD* 2005, 2005.7. In this article, window definition will be arranged and method evaluating for a window set function in a data stream environment will be described in detail. When the input data enters, it is calculated in which window the input data are included and it is applied to a set operation process. It can be marked that each of data can be included in a plurality of windows.

Since the conventional technology of the article collectively evaluates queries in a state that a space for a plurality of windows is acquired, there is a problem that resources are unnecessarily wasted. Also, since the conventional technology processes only a window set function, there is a limitation when the conventional technology is applied to the stream data processing system for processing the continuous query including window operation.

SUMMARY OF THE INVENTION

It is, therefore, an object of the present invention to provide a stream data processing system and method which can improve performance of an entire system and reduce resources loss by avoiding duplication of data query evaluation based on a previous query condition evaluation result in consideration of characteristics that the same data are repeatedly included in a query object range window in continuous query process of stream data collected from an external sensor in a ubiquitous environment.

Other objects and advantages of the invention will be understood by the following description and become more apparent from the embodiments in accordance with the present invention, which are set forth hereinafter. It will be also apparent that objects and advantages of the invention can be embodied easily by the means defined in claims and combinations thereof.

In accordance with an aspect of the present invention, there is provided a stream data processing system for avoiding duplication of data processing, the system including: an evaluation result storing unit for updating and storing a query condition evaluation result; a window evaluating unit for performing window evaluation on stream data; a data separating unit for separating data transmitted from the window evaluating unit into new data and duplication input data based on reusability of the previous query condition evaluation result; a reuse result extracting unit for receiving duplication input data from the data separating unit and extracting a query condition evaluation result from the evaluation result storing unit; a query condition evaluating unit for receiving new data from the data separating unit, performing query condition evaluation and creating a query condition evaluation result; and a result organizing unit for receiving the query condition evaluation result from the reuse result extracting unit and the query condition evaluating unit, merging, outputting and transmitting the query condition evaluation result to the evaluation result storing unit.

In accordance with another aspect of the present invention, there is provided a method for avoiding duplication of data process in a stream data processing system, the method including the steps of: a) receiving stream data from outside; b) performing window evaluation on the inputted stream data; c) separating the data on which window evaluation is performed into duplication input data and new data based on reusability of a previous query condition evaluation result; d) extracting a query condition evaluation result for the duplication input data from the previous query condition evaluation result; e) performing query condition evaluation on the new data and creating a query condition evaluation result; f) merging each query condition evaluation result of the duplication input data and the new data; and g) updating the previous query condition evaluation result based on the merged query condition evaluation result.

BRIEF DESCRIPTION OF THE DRAWINGS

The above and other objects and features of the present invention will become apparent from the following description of the preferred embodiments given in conjunction with the accompanying drawings, in which:

FIG. 3 shows input stream data of an Extensible Markup Language (XML) form in accordance with an embodiment of the present invention;

DETAILED DESCRIPTION OF THE INVENTION

Other objects and advantages of the present invention will become apparent from the following description of the embodiments with reference to the accompanying drawings. Therefore, those skilled in the art that the present invention is included can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

FIG. 3 shows input stream data of an Extensible Markup Language (XML) form in accordance with an embodiment of the present invention.

Stream data 310 to 320 of the XML form are used as input data of a stream data processing system of the present invention. The stream data 310 to 320 are inputted as data, respectively.

The stream data processing system of the present invention uses a query language extending XQuery for window definition to search user's concern from the stream data of the XML form.

Referring to a query language used in the present invention, each query includes a window definition part and a search condition part. The window definition part includes values showing window start/end, tumbling and a window data limiting method. For example, when the window start value is "−1", the value means a landmark window. "second" and "event" mean a time and an event, respectively, as a window data limiting method. In the sliding window, "tumbling" means tumbling at a time of sliding. In the landmark window, the "tumbling" means an increase unit of a window size. The search condition part follows an XQuery syntax.

As a detailed example of the query syntax, when "a window limiting 5 events inputted from a sensor 1 and sliding the event into two event units" is expressed as the query language used in the present invention, it becomes "a window limiting data based on an event that the window start/end values are 0 and 5, respectively, and the tumbling is 2 in data inputted from the sensor 1". It is also expressed as "using "sensor1" as $s1 within 1 to 5, 2 event" in the query syntax.

When the query syntax is expressed based on the time instead of the event among window limiting methods, it becomes "using "sensor1" as $s1 within 1 to 5, 2 second".

Figure 4:
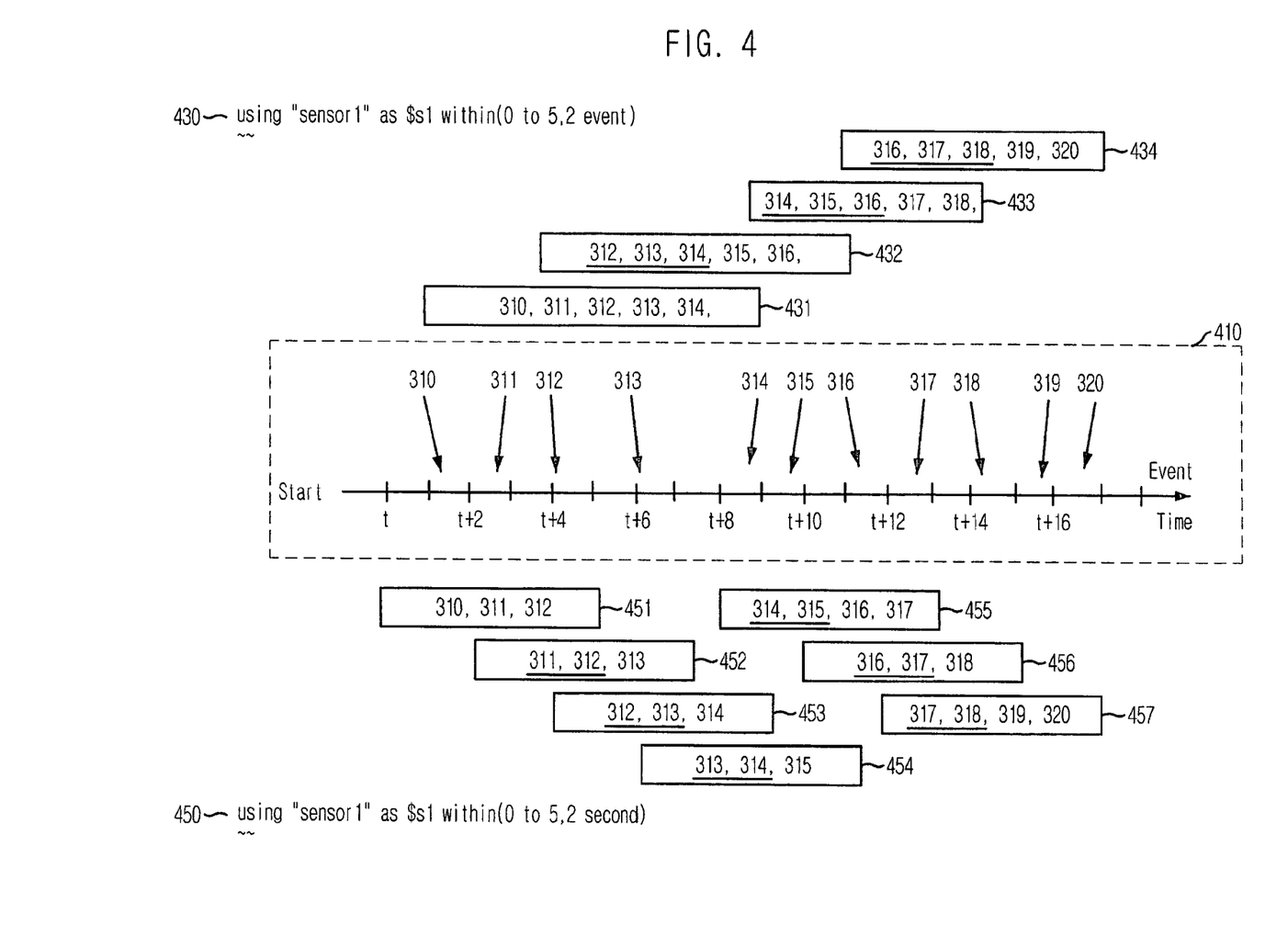
FIG. 4 shows window binding of input stream data in accordance with the embodiment of the present invention.

FIG. 4 shows window binding of input stream data in accordance with the embodiment of the present invention.

A reference number "410" shows a procedure that the data 310 and 320 of FIG. 3 sensed from diverse sensors of outside are inputted in a form of stream in an order. A horizontal axis is a time axis showing time flow. Reference numbers "430" and "450" are the query syntax described in FIG. 3 as an example and respectively show cases using the event and the time, i.e., event-based query syntax and time-based query syntax, among the window data limiting methods.

When query starts at "t" point of time of "410" and the data sensed from the sensor are inputted in an order of "310, 311, 312, ..., 319, 320", a window evaluation result for processing an event-based query syntax 430, i.e., evaluating query condition, is "431, 432, 433, 434" and a window evaluation result for processing a time-based query syntax 450 is "451, 452, 453, 454, 455, 456, 457".

The window evaluation results are "310, 311, 312, 313, 314" in an event-based window "431", "312, 313, 314, 315, 316" in "432", "314, 315, 316, 317, 318" in "433", and "316, 317, 318, 319, 320" in "434".

The window evaluation results are "310, 311, 312" in a time-based window "451", "311, 312, 313" in "452", "312, 313, 314" in "453", "313, 314, 315" in "454", "314, 315, 316, 317" in "455", "316, 317, 318" in "456" and "317, 318, 319, 320" in "457".

Each window based on the event/time simultaneously includes duplicated data as the window evaluation result.

Figure 5:
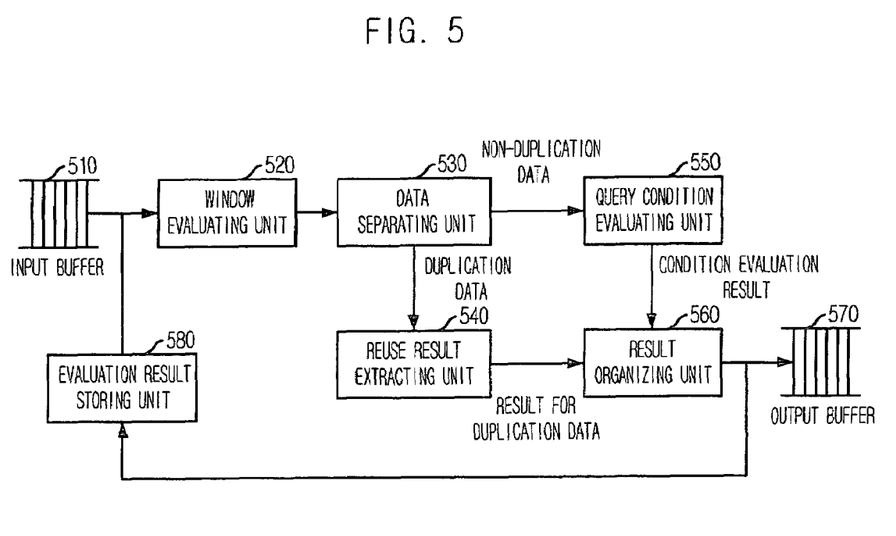
FIG. 5 shows a stream data processing system for avoiding duplication of data process in accordance with the embodiment of the present invention.

FIG. 5 shows a stream data processing system for avoiding duplication of data process in accordance with the embodiment of the present invention.

The stream data processing system includes an input buffer 510, a window evaluating unit 520, a data separating unit 530, a query condition evaluating unit 550, a reuse result extracting unit 540, a result organizing unit 560, output buffer 570, and evaluation result storing unit 580.

The input buffer 510 receives data sensed from diverse sensors of outside in a stream form.

The window evaluating unit 520 reads the stream data from the input buffer 510, evaluates a window and selects data to be an object of next query condition evaluation.

The data separating unit 530 separates the data selected by the window evaluating unit 520 based on whether the data is alternated into a previous query condition evaluation result, transmits inalterable data to the query condition evaluating unit 550, and transmits alterable data, i.e., duplication input data, to the reuse result extracting unit 540.

The query condition evaluating unit 550 performs a query condition evaluation on the data transmitted from the data separating unit 530 and creates a query condition evaluation result.

The reuse result extracting unit 540 receives the duplication input data from the data separating unit 530 and extracts a query condition evaluation result related to the previous window evaluation result from the previous query condition evaluation result of the evaluation result storing unit 580.

The result organizing unit 560 merges the new query condition evaluation result from the query condition evaluating unit 550 and the query condition evaluation result for the duplication input data from the reuse result extracting unit 540, outputs the merged result to the output buffer 570, and updates the previous query condition evaluation result stored in the evaluation result storing unit 580.

The output buffer 570 temporally stores the query condition evaluation result from the result organizing unit 560 for output.

The evaluation result storing unit 580 stores the query condition evaluation result from the result organizing unit 560.

Since the stream data processing system of the present invention performs a continuous query process on the stream data, all procedures of window evaluation, query condition evaluation, and result organization are repeatedly performed.

Figure 6:
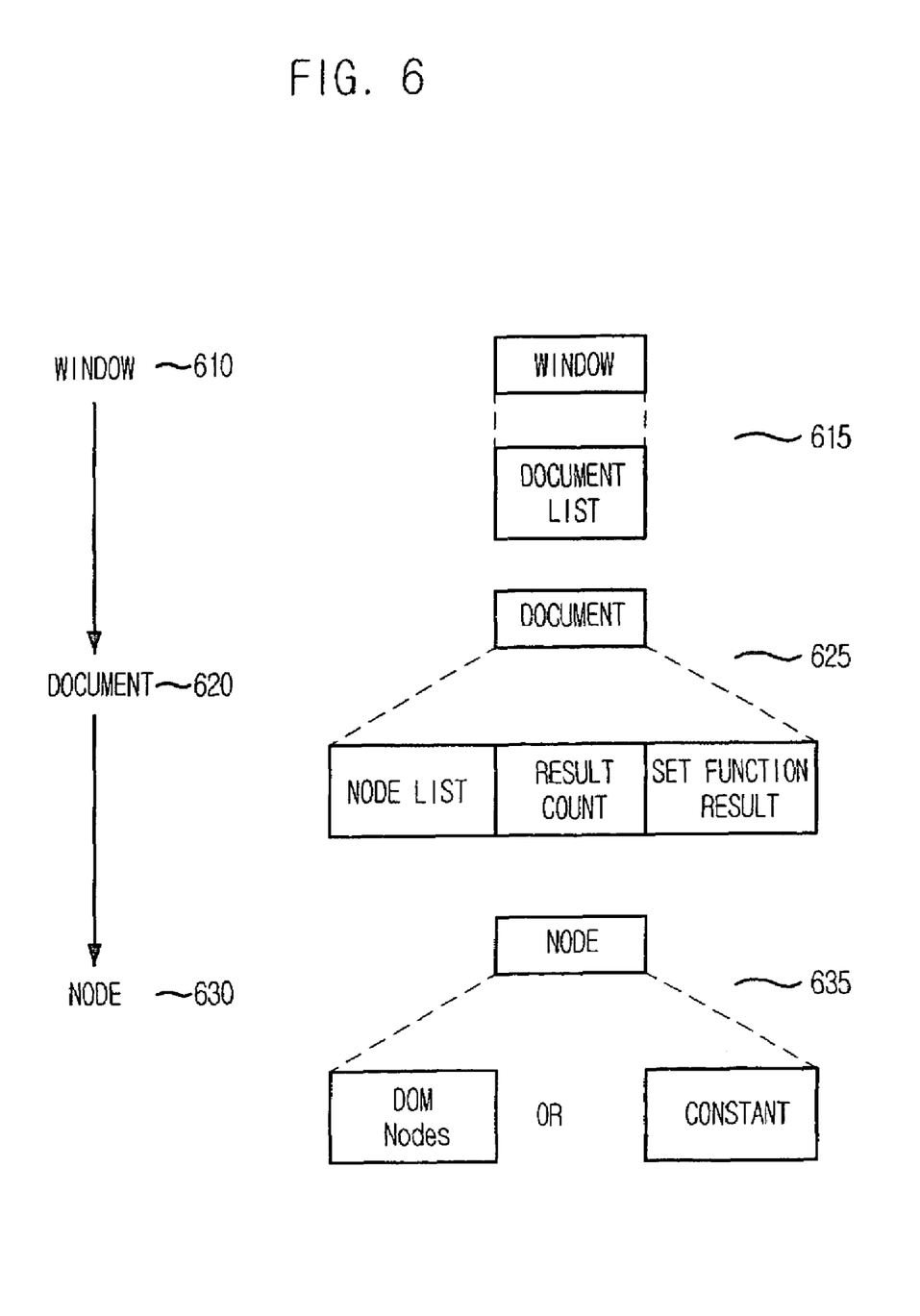
FIG. 6 shows a hierarchical structure of a query condition evaluation result in the stream data processing system in accordance with the embodiment of the present invention.

FIG. 6 shows a hierarchical structure of the query condition evaluation result in the stream data processing system in accordance with the embodiment of the present invention.

The stream data processing system of the present invention hierarchically stores the continuously created query condition evaluation result to make it easy to reuse the query condition evaluation result at a next time. That is, the query condition evaluation result is stored in a form of "window 610-document 620-node 630". All of the created query condition evaluation results are not accumulated. The query condition evaluation results are stored by a method for updating the pre-stored previous evaluation result based on the new query condition evaluation result.

Referring to a hierarchical storing form of "window 610-document 620-node 630", window levels 610 and 615 show a query condition evaluation result for an entire window. Accordingly, the query condition evaluation result of a plurality of document levels is designated.

Document levels 620 and 625 show a query condition evaluation result for input data. Since a plurality of query condition evaluation results may come out from the input data, the query condition evaluation result of many node levels should be designated. The document levels 620 and 625 store the total number of results and a set function performance result included in the document level for efficiency of a set function operation.

Node levels 630 and 635 shows a result among many query condition evaluation results which can be derived from the input data. The node levels 630 and 635 store a constant as well as an XML node.

Figure 7:
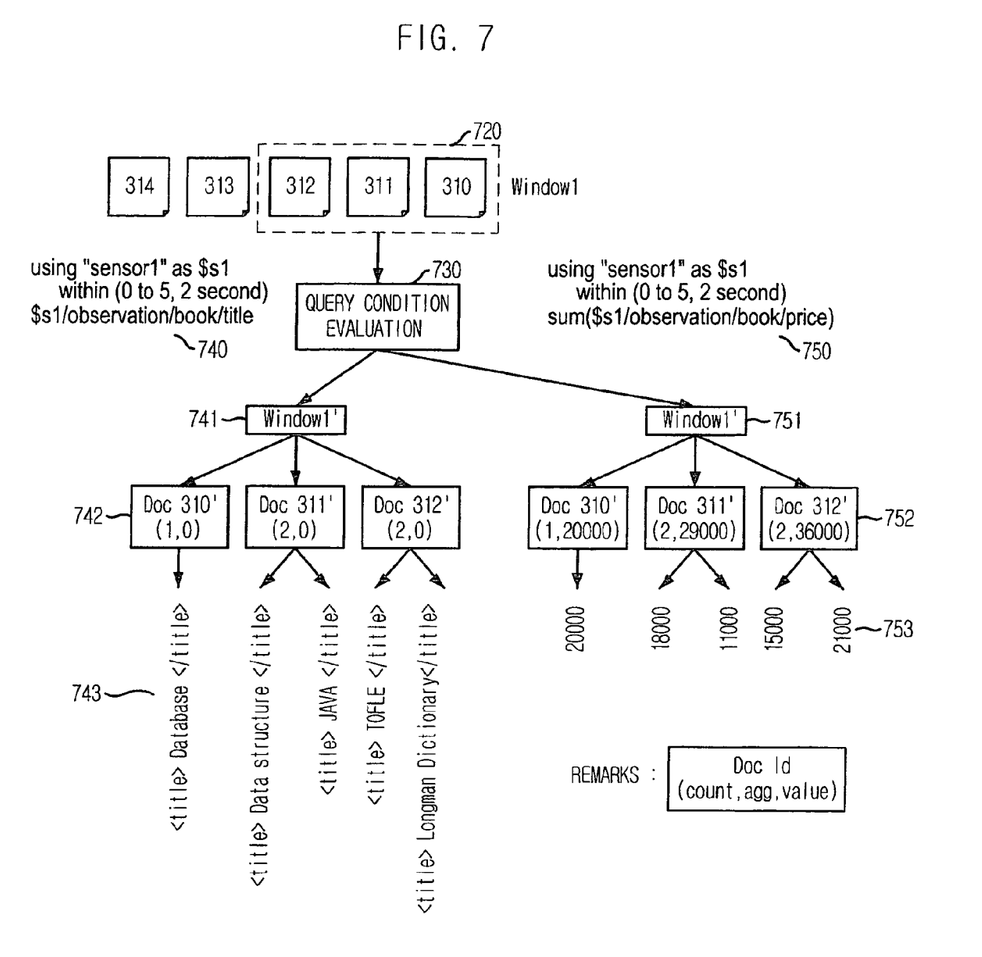
FIG. 7 shows a method for storing the query condition evaluation result in the stream data processing system in accordance with the embodiment of the present invention.

FIG. 7 shows a method for storing the query condition evaluation result in the stream data processing system in accordance with the embodiment of the present invention.

If the stream data processing system of the present invention processes stream data based on query syntax window definition such as the reference number 450 of FIG. 4, XML documents "310, 311 and 312" as a window evaluation result of the step S720 are transmitted to input data of the query condition evaluating procedure of "730".

When the query is to acquire a title of a book for the window evaluation result at "740", a window 1' of "741", i.e., a query condition evaluation result of a window level, is created as a result of the reference number 730. The window 1' of "741" includes query condition evaluation results of the document level, i.e., "Doc310', Doc311', Doc312'" of "742" as query condition evaluation results for each of the input data "310, 311, 312". The "Doc310', Doc311', Doc312'" of "742" respectively include a query condition evaluation result of a node level, i.e., a part "743" satisfying a query condition among nodes organizing an actual input XML document.

As another example, when the query is for a set function, just as "750", a set function result value for input data, i.e., an XML document, and the number of node satisfying a set function factor, i.e., information on the result value, are stored together in a storing form of the document level at "752".

Figure 8:
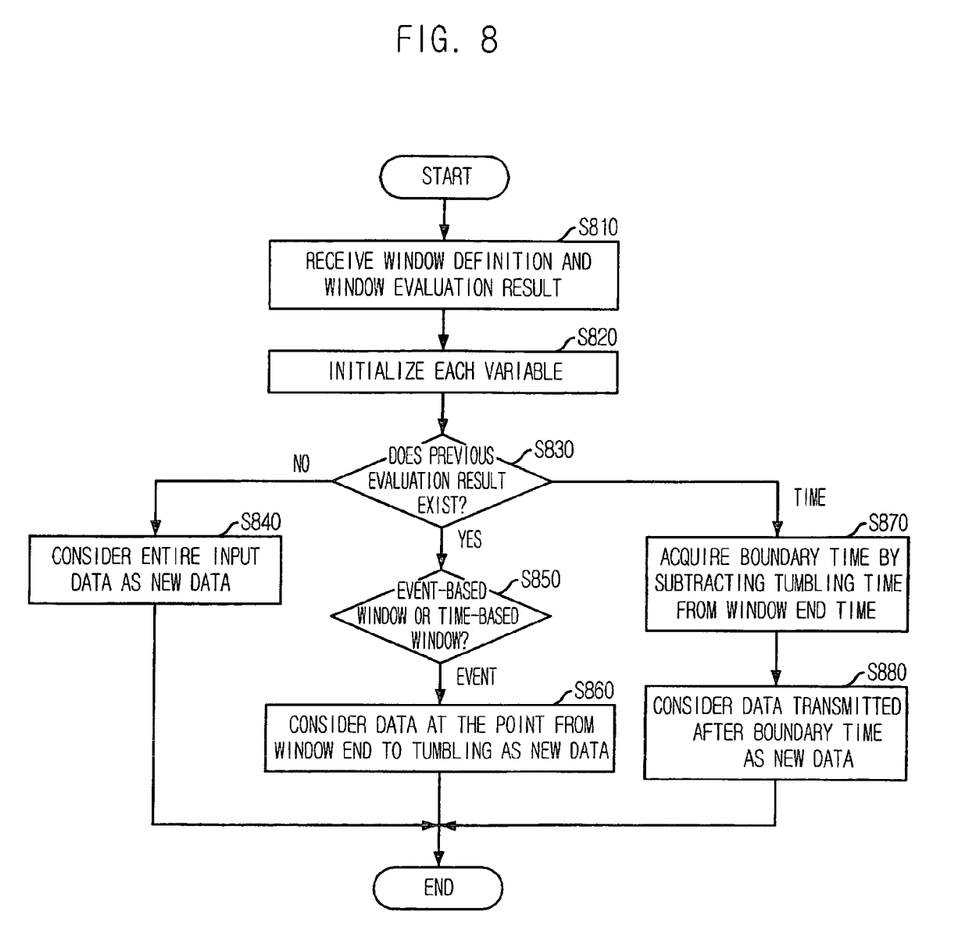
FIG. 8 is a flowchart describing a data separating procedure for avoiding duplication of data process in the stream data processing system in accordance with an embodiment of the present invention.

FIG. 8 is a flowchart describing a data separating procedure for avoiding duplication of data process in the stream data processing system in accordance with an embodiment of the present invention.

The data separating unit 530 receives window definition outputted by the window evaluating unit 520 and a window evaluation result at step S810. The window definition includes window start/end, tumbling, and a window data limiting method.

The data separating unit 530 initializes each variable for separately storing duplication input data and new data at step S820 and determines at step S830 whether the previous query condition evaluation result is pre-stored.

When it turns out that there is no pre-stored previous query condition evaluation result, the data transmitted from the data separating unit 530 are considered as new data at step S840. That is, the transmitted entire data, which are included in the window evaluation result, are transmitted to the query condition evaluating unit 550.

When it turns out that there is the pre-stored previous query condition evaluation result, it is determined at step S850 whether the window data limiting method is the event or time among window definitions transmitted from the data separating unit 530.

When it turns out that the window is based on the event, the data as much as tumbling from the window end are considered as new data, and other data are considered as duplication input data at step S860.

When it turns out that the window is based on the time, a boundary time is acquired by subtracting a time of tumbling from the window end time at step S870. Subsequently, the data transmitted before the boundary time are considered as duplication input data and the data transmitted after the boundary time are considered as new data at step S880.

The separated duplication input data and new data are transmitted to the reuse result extracting unit 540 and the query condition evaluating unit 550, respectively.

Referring to series of detailed operations of the reuse result extracting unit 540 receiving the duplication input data, the reuse result extracting unit 540 extracts a query condition evaluation result for reuse based on duplication input data number information.

The query condition evaluation result for duplication input data among pre-stored previous query condition evaluation results, i.e., the reusable query condition evaluation result, is counted from the last item of the query condition evaluation result list in the document level to the item of the document number of the duplicated window evaluation result. For example, when doc0, doc1, doc2, doc3 and doc4 are stored in an order as the query condition evaluation result of the document level in the pre-stored previous query condition evaluation result and the number of the duplication input data is 3, a set of doc2, doc3 and doc4 becomes a previous query condition evaluation result which can be reused in the query condition evaluation.

Figure 9:
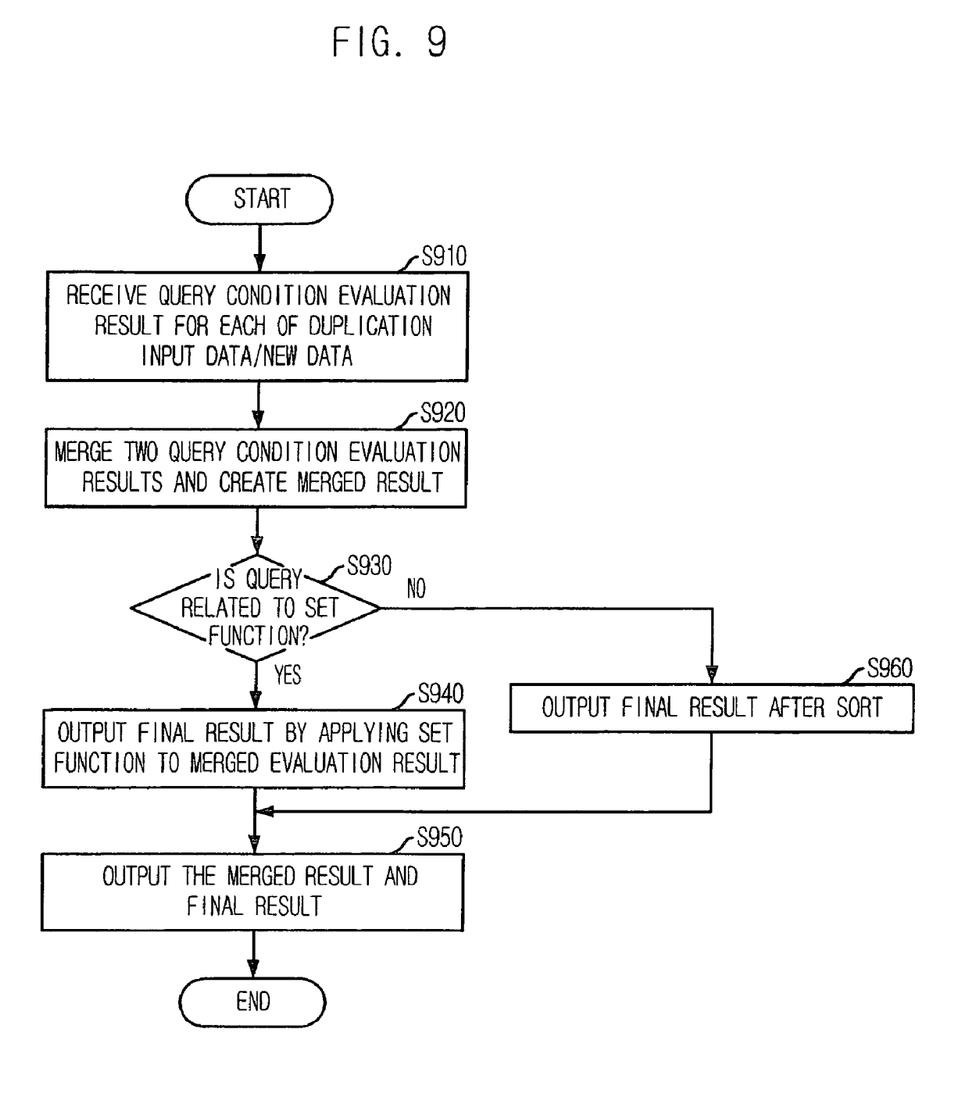
FIG. 9 is a flowchart describing a procedure for merging previous query condition evaluation results and present process results in the stream data processing system in accordance with the embodiment of the present invention.

FIG. 9 is a flowchart describing a procedure for merging previous query condition evaluation results and present process results in the stream data processing system in accordance with the embodiment of the present invention.

The result organizing unit 560 receives query condition evaluation results for each of duplication input data/new data from the reuse result extracting unit 540 and the query condition evaluating unit 550 at step S910.

The result organizing unit 560 merges the transmitted query condition evaluation results for duplication input data and the new data according to the above order at step S920. That is, the result organizing unit 560 merges the transmitted query condition evaluation results for the duplication input data and the new data in the order and creates a merged result.

The result organizing unit 560 determines at step S930 whether the query used in the merged query condition evaluation result is related to a set function.

When it turns out that the query is related to the set function, a final result is outputted by applying the set function to the merged query condition evaluation result at step S940. The final result is outputted based on a result count, which is a field for a set function in a storing structure of the document level, and agg_value, which is a result value.

When the set function is "sum/count", the final result is acquired by adding the result values of the document level. When the set function is "min/max", the minimum/maximum values among the result values of the document level become the final result. When the set function is "avg", the final result is acquired by adding the result values of the document level and dividing the added result values by a total result count.

When the query is not related to the set function, the merged query condition evaluation result is sorted by using a value of sort item, if necessary, and the final result is outputted at step S960.

The outputted final result and the merged result are outputted at step S950. That is, the outputted final result and the merged result are transmitted to the evaluation result storing unit 580 and the output buffer 570, respectively.

Figure 10:
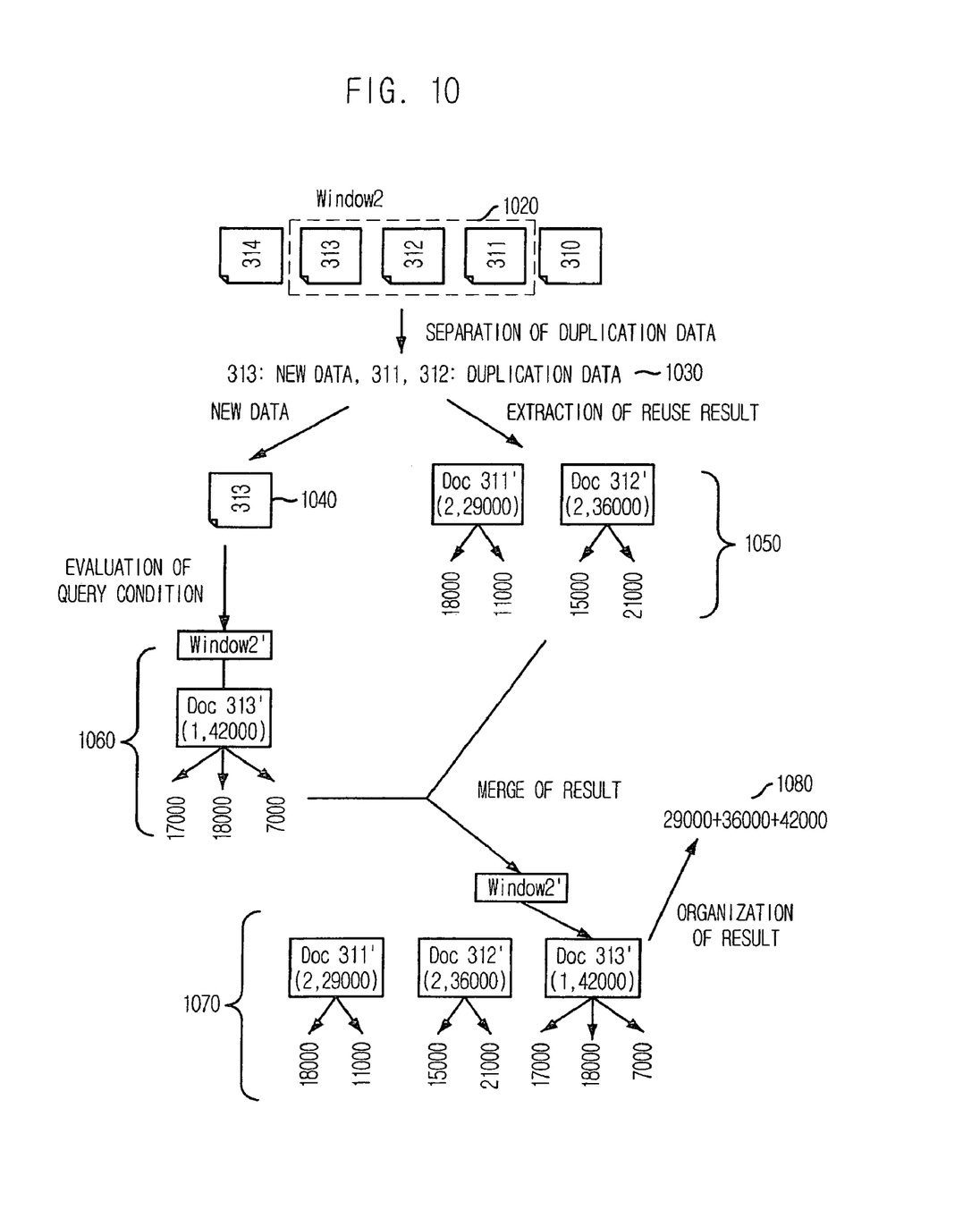
FIG. 10 shows a case of reusing the query condition evaluation result in the stream data processing system in accordance with the embodiment of the present invention.

FIG. 10 shows a case of reusing the query condition evaluation result in the stream data processing system in accordance with the embodiment of the present invention.

When a query corresponds to "750" of FIG. 7 and previous query condition evaluation results correspond to "751", "752" and "753" of each level of window/document/node, documents 311, 312 and 313 are selected as an object for query evaluation according to a next window evaluation result 1020. Accordingly, the document 313 is separated from the documents 311 and 312 by finding that the documents 311 and 312 are data having the previous query condition evaluation result and the document 313 is new data by using the window definition, i.e., window start/end, tumbling and the window data limiting method.

Query condition evaluation "1060" is performed on the document 313 selected as the data which are not duplicated in the window evaluation result 1020.

The query condition evaluation results of the documents 311 and 312 are extracted for the documents 311 and 312 selected as the duplication input data based on "751", "752" and "753" of FIG. 7, which is the previous query condition evaluation result, just as "1050". Subsequently, the two query condition evaluation results are merged.

Since the query is related to "sum" of the set function, a value adding 29000, 36000 and 42000, which are sum values satisfying a condition in the document level of the merged query condition evaluation result, is outputted as a final result.

That is, the pre-stored data are used instead of re-performing the query condition evaluation procedure on the documents 311 and 312, which are the duplication input data.

Figure 11:
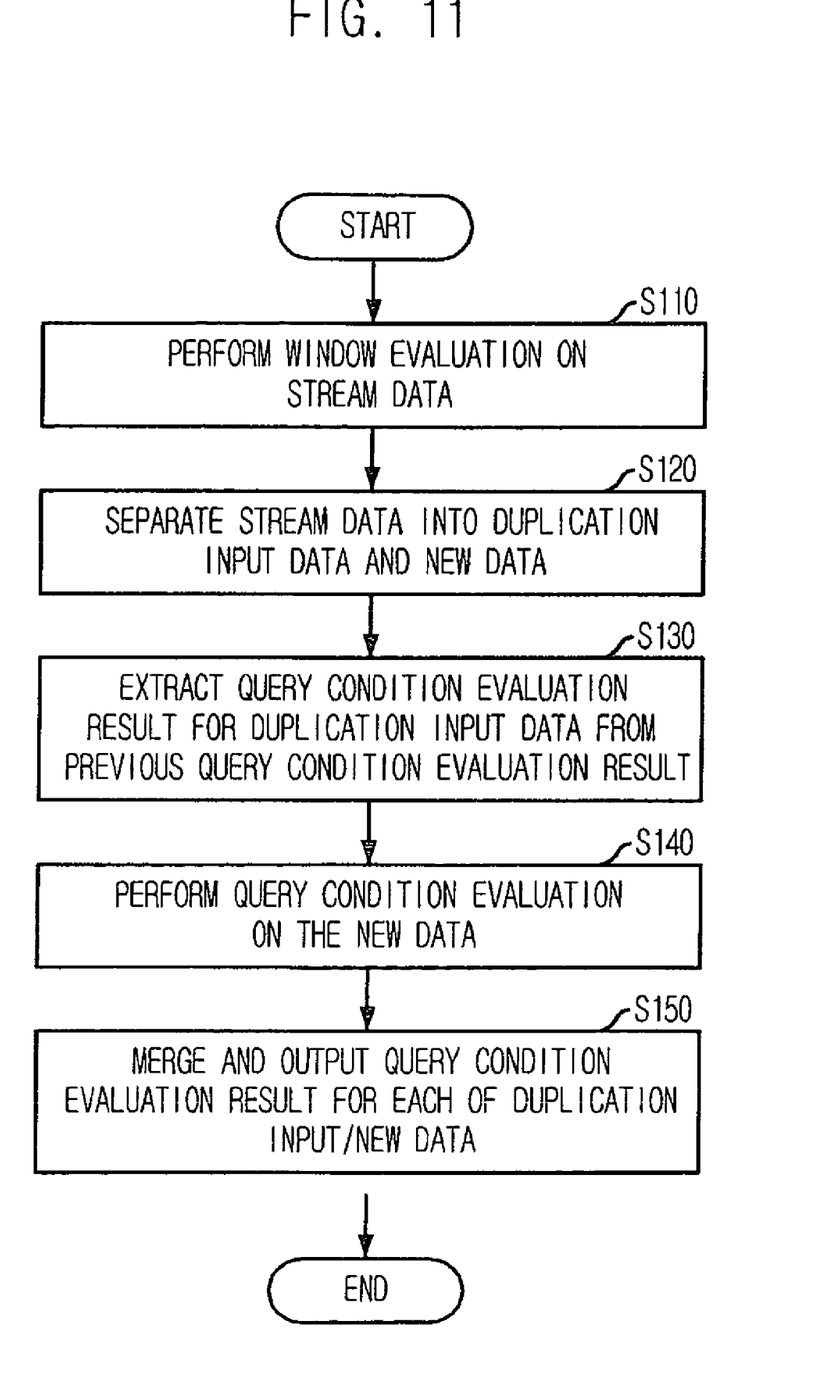
FIG. 11 is a flowchart describing a method for avoiding duplication of data process in the stream data processing system in accordance with the embodiment of the present invention

FIG. 11 is a flowchart describing a method for avoiding duplication of data process in the stream data processing system in accordance with the embodiment of the present invention.

When the window evaluating unit 520 performs window evaluation on stream data collected from outside at step S110, the data separating unit 530 separates the stream data based on the window evaluation result, transmits duplication input data to the reuse result extracting unit 540 and transmits new data to the query condition evaluating unit 550 at step S120.

The reuse result extracting unit 540 extracts a query condition evaluation result for the duplication input data from the previous query condition evaluation result, i.e., the query condition evaluation result of each level of window/document/node, and transmits the query condition evaluation result to the result organizing unit 560 at step S130. Also, the query condition evaluating unit 550 performs query condition evaluation on the new data and transmits the result to the result organizing unit 560 at step S140. An order of the procedure for extracting and evaluating the query condition can be changed.

The result organizing unit 560 merges and outputs the data respectively transmitted from the reuse result extracting unit 540 and the query condition evaluating unit 550 at step S150. The finally merged query condition evaluation result is stored in the evaluation result storing unit 580. That is, the previous query condition evaluation result is updated.

The present invention can improve performance of the system and reduce resources waste by avoiding duplication of data process based on the pre-stored previous query condition evaluation result in the continuous query process including the window operation.

As described in detail, the technology of the present invention can be realized as a program and stored in a computer-readable recording medium, such as CD-ROM, RAM, ROM, floppy disk, hard disk and magneto-optical disk. Since the process can be easily implemented by those skilled in the art of the present invention, further description will not be provided herein.

The present application contains subject matter related to Korean patent application Nos. 2005-0116098 and 2006-0016335, filed with the Korean Intellectual Property Office on Dec. 1, 2005, and Feb. 20, 2006, respectively, the entire contents of which are incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A stream data processing system for avoiding duplication of data processing, comprising:
an evaluation result storing means for updating and storing a query condition evaluation result;
a window evaluating means for performing window evaluation on stream data;
a data separating means for separating for stream data transmitted from the window evaluating means into new data and duplication input data based on reusability of the previous query condition evaluation result;
a reuse result extracting means for receiving duplication input data from the data separating means and extracting a query condition evaluation result from the evaluation result storing means;
a query condition evaluating means for receiving new data from the data separating means, performing query condition evaluation and creating a query condition evaluation result; and
a result organizing means for receiving the query condition evaluation results from the reuse result extracting means and the query condition evaluating means, merging, outputting and transmitting the query condition evaluation result to the evaluation result storing means.

2. The system as recited in claim 1, wherein the query condition evaluating means performs continuous query on the new data transmitted from the data separating means.

3. The system as recited in claim 2, wherein the window evaluating means transmits window definition and the window evaluation result to the data separating means when the window evaluation of the stream data is performed.

4. The system as recited in claim 3, wherein when the data separating means separates the stream data based on reusability of the previous query condition evaluation result, the data separating means separates the stream data included in the window evaluation result into duplication input data and new data based on the window definition.

5. The system as recited in claim 4, wherein when the data separating means confirms that there is no pre-stored query condition evaluation result, the data separating means considers the entire data included in the window evaluation result as the new data and transmits the data to the query condition evaluating means.

6. The system as recited in claim 4, wherein the data separating means receives the window definition including window start, window end, tumbling and a window data limiting method from the window evaluating means.

7. The system as recited in claim 6, wherein when the data separating means confirms that there is the pre-stored query condition evaluation result and the window data limiting method is an event, the data separating means considers the data as much as tumbling from the window end as new data, transmits the data to the query condition evaluating means, considers other data as duplication input data, and transmits the other data to the reuse result extracting means.

8. The system as recited in claim 6, wherein when the data separating means confirms that there is the pre-stored query condition evaluation result and the window data limiting method is a time, the data separating means acquires a boundary time by subtracting a tumbling value from the window end time, considers data transmitted before the boundary time as the duplication input data and considers data transmitted after the boundary time as the new data.

9. The system as recited in claim 1, wherein when a query is related to a set function, the result organizing means applies the set function to the merged query condition evaluation result, acquires a final result, outputs the final result with the merged query condition evaluation result.

10. The system as recited in claim 9, wherein the query condition evaluating means performs query condition evaluation on the new data, separates the query evaluation result based on window, document and node levels and hierarchically stores the query evaluation result.

11. The system as recited in claim 10, wherein the window evaluating means performs window evaluation on the stream data of an Extensible Markup Language (XML) form.

12. A method for avoiding duplication of data process in a stream data processing system, comprising the steps of:
a) receiving stream data from outside;
b) performing window evaluation on the stream data;
c) separating the stream data on which window evaluation is performed into duplication input data and new data based on reusability of a previous query condition evaluation result;
d) extracting a query condition evaluation result for the duplication input data from the previous query condition evaluation result;
e) performing query condition evaluation on the new data and creating a query condition evaluation result;

f) merging each query condition evaluation result of the duplication input data and the new data; and g) updating the previous query condition evaluation result based on the merged query condition evaluation result.

13. The method as recited in claim 12, wherein in the step b), window evaluation is performed on the stream data, and window definition and a window evaluation result are outputted.

14. The method as recited in claim 13, wherein in the step c), when the stream data are separated based on the reusability of the previous query condition evaluation result, the data included in the window evaluation result are separated into duplication input data and new data based on the window definition.

15. The method as recited in claim 14, wherein when it is confirmed that there is no pre-stored query condition evaluation result, entire data included in the window evaluation result are considered as the new data in the step c).

16. The method as recited in claim 14, wherein in the step b), the window definition including window start, window end, tumbling and a window data limiting method is outputted.

17. The method as recited in claim 16, wherein when it is confirmed that there is the pre-stored query condition evaluation result and the window data limiting method is an event, data as much as tumbling from the window end are considered as the new data and other data are considered as the duplication input data in the step c).

18. The method as recited in claim 16, wherein when it is confirmed that there is the pre-stored query condition evaluation result and the window data limiting method is a time, a boundary time is acquired by subtracting a tumbling value from the window end time, and the data transmitted before the boundary time are considered as the duplication input data and the data transmitted after the boundary time are considered as the new data.

19. The method as recited in claim 12, wherein when the query is related to a set function, a final result is outputted by applying the set function to the merged query condition evaluation result in the step f).

20. The method as recited in claim 19, wherein in the step e), the query condition evaluation is performed on the new data and the query evaluation results are hierarchically stored based on window, document and node levels.

* * * * *